(12) United States Patent
Wang (10) Patent No.: US 10,284,330 B2
(45) Date of Patent: May 7, 2019

(54) DATA TRANSMISSION METHOD, DEVICE, AND SYSTEM (71) Applicant: Huawei Technologies Co., Ltd., Shenzhen (CN)

(72) Inventor: Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/562,779

(22) PCT Filed: Apr. 3, 2015

(86) PCT No.: PCT/CN2015/075822
§ 371 (c)(1),
(2) Date: Sep. 28, 2017

(87) PCT Pub. No.: WO2016/154999
PCT Pub. Date: Oct. 6, 2016

(65) Prior Publication Data
US 2018/0287731 A1  Oct. 4, 2018

(51) Int. Cl.
*H04L 1/00* (2006.01)
*H04L 1/08* (2006.01)

(52) U.S. Cl.
CPC .......... *H04L 1/0009* (2013.01); *H04L 1/007* (2013.01); *H04L 1/0033* (2013.01); *H04L 1/0041* (2013.01); *H04L 1/0089* (2013.01); *H04L 1/08* (2013.01); *H04L 1/0075* (2013.01); *H04L 2001/0098* (2013.01)

(58) Field of Classification Search
CPC ..................................... H04L 1/0009
See application file for complete search history.

(56) References Cited

U.S. PATENT DOCUMENTS 5,659,569 A * 8/1997 Padovani ............... H04B 1/707
  370/479
5,710,784 A * 1/1998 Kindred ................ H03M 13/37
  375/262

(Continued)

FOREIGN PATENT DOCUMENTS

CN  102142885 A   8/2011
CN  102281646 A  12/2011

(Continued)

OTHER PUBLICATIONS

Machine Translation and Abstract of German Publication No. DE10052720, May 2, 2002, 12 pages.

(Continued)

*Primary Examiner* — Parth Patel
(74) *Attorney, Agent, or Firm* — Conley Rose, P.C.

(57) ABSTRACT

A data transmission method, device, and system to resolve a problem that encoding cannot be performed based on an incomplete subframe because a length of the incomplete subframe is unknown. A first device generates a first subframe and a second subframe according to first data, determines a redundancy version (RV) of the first subframe according to an RV of the second subframe, and sends M of N orthogonal frequency division multiplexing (OFDM) symbols of the first subframe and N OFDM symbols of the second subframe to a second device.

15 Claims, 3 Drawing Sheets

(56) References Cited

U.S. PATENT DOCUMENTS

| | | | | |
|---|---|---|---|---|
| 6,714,597 B1* | 3/2004 | Antonio | | H04B 15/00 |
| | | | | 370/311 |
| 7,813,294 B2* | 10/2010 | Xiang | | H04L 47/10 |
| | | | | 370/230 |
| 8,654,661 B2* | 2/2014 | Wang | | H04L 1/0025 |
| | | | | 370/252 |
| 9,319,200 B2* | 4/2016 | Liu | | H04L 5/0055 |
| 9,572,198 B1* | 2/2017 | Shah | | H04W 92/02 |
| 9,780,919 B2* | 10/2017 | Vermani | | H04L 1/0072 |
| 2008/0285691 A1* | 11/2008 | Onggosanusi | | H04L 1/06 |
| | | | | 375/346 |
| 2009/0100309 A1* | 4/2009 | Zheng | | H04L 1/0041 |
| | | | | 714/748 |
| 2010/0027460 A1* | 2/2010 | Kim | | H04L 1/1819 |
| | | | | 370/315 |
| 2010/0098006 A1* | 4/2010 | Golitschek Edler Von Elbwart | | H04L 1/854 |
| | | | | 370/329 |
| 2011/0064061 A1* | 3/2011 | Takeuchi | | H04L 1/1822 |
| | | | | 370/336 |
| 2011/0176519 A1* | 7/2011 | Vitthaladevuni | | H04B 7/0452 |
| | | | | 370/336 |
| 2011/0205982 A1* | 8/2011 | Yoo | | H04L 1/0038 |
| | | | | 370/329 |
| 2012/0294210 A1 | 11/2012 | Jiang et al. | | |
| 2012/0314655 A1* | 12/2012 | Xue | | H04L 1/0076 |
| | | | | 370/328 |
| 2013/0223485 A1* | 8/2013 | Bai | | H04L 1/0068 |
| | | | | 375/219 |
| 2013/0294367 A1* | 11/2013 | Jalloul | | H04W 72/082 |
| | | | | 370/329 |
| 2014/0126454 A1* | 5/2014 | Zhang | | H04W 4/06 |
| | | | | 370/312 |
| 2015/0085797 A1* | 3/2015 | Ji | | H04J 3/16 |
| | | | | 370/329 |
| 2015/0349924 A1* | 12/2015 | Wang | | H04L 1/0061 |
| | | | | 714/807 |
| 2015/0349932 A1* | 12/2015 | Onodera | | H04W 16/28 |
| | | | | 370/329 |
| 2015/0358115 A1* | 12/2015 | Wang | | H04W 72/0446 |
| | | | | 714/776 |
| 2016/0099985 A1* | 4/2016 | Koskinen | | H04L 12/189 |
| | | | | 370/260 |
| 2016/0119453 A1* | 4/2016 | Tian | | H04L 5/04 |
| | | | | 370/338 |
| 2016/0157213 A1* | 6/2016 | Takeda | | H04L 1/1822 |
| | | | | 370/329 |
| 2016/0173237 A1* | 6/2016 | Braun | | H04L 1/0056 |
| | | | | 370/242 |
| 2017/0230149 A1* | 8/2017 | Wang | | H04L 1/1819 |
| 2017/0272211 A1* | 9/2017 | Chen | | H04L 1/1825 |
| 2017/0338919 A1* | 11/2017 | Lim | | H04B 7/0452 |
| 2017/0353906 A1* | 12/2017 | Chen | | H04W 28/04 |
| 2018/0241459 A1* | 8/2018 | Song | | H04B 7/155 |

FOREIGN PATENT DOCUMENTS

| | | |
|---|---|---|
| CN | 103248464 A | 8/2013 |
| DE | 10052720 A1 | 5/2002 |

OTHER PUBLICATIONS

Foreign Communication From A Counterpart Application, European Application No. 15886969.3, Extended European Search Report dated Feb. 8, 2018, 8 pages.

Machine Translation and Abstract of Chinese Publication No. CN102281646, Dec. 14, 2011, 47 pages.

Machine Translation and Abstract of Chinese Publication No. CN103248464, Aug. 14, 2013, 39 pages.

Foreign Communication From A Counterpart Application, PCT Application No. PCT/CN2015/075822, English Translation of International Search Report dated Jan. 6, 2016, 2 pages.

Foreign Communication From A Counterpart Application, PCT Application No. PCT/CN2015/075822, English Translation of Written Opinion dated Jan. 6, 2016, 7 pages.

* cited by examiner

DATA TRANSMISSION METHOD, DEVICE, AND SYSTEM

CROSS-REFERENCE TO RELATED APPLICATION

This application is a U.S. National Stage of International Patent Application No. PCT/CN2015/075822 filed on Apr. 3, 2015, which is hereby incorporated by reference in its entirety.

TECHNICAL FIELD

The present disclosure relates to the communications field, and in particular, to a data transmission method, device, and system.

BACKGROUND

In a wireless communications network, devices need to transmit information using a frequency resource. The frequency resource is also referred to as a spectrum. The spectrum may be classified into a licensed spectrum and an unlicensed spectrum. The licensed spectrum is a frequency resource exclusive to some operators. The unlicensed spectrum is a common frequency resource in the wireless communications network. With development of communications technologies, an amount of information transmitted in the wireless communications network gradually increases. Preempting the unlicensed spectrum to transmit information may improve a data throughput in the wireless communications network, and better satisfy a user requirement.

In a scenario of preempting the unlicensed spectrum for data transmission, after a device successfully preempts a channel of the unlicensed spectrum, the device may send data at any moment. Consequently, the moment at which the device sends the data may not be a start moment of a complete subframe. That is, the first subframe sent by the device may not be a complete subframe. However, before sending the data, the device needs to perform code modulation on the data, and needs to learn a size of a physical resource. In this case, how to perform code modulation on the incomplete subframe becomes a problem that urgently needs to be resolved.

SUMMARY

Embodiments of the present disclosure provide a data transmission method, device, and system, to resolve a problem that encoding cannot be performed based on an incomplete subframe because a length of the incomplete subframe is unknown.

To achieve the foregoing objective, the following technical solutions are used in the embodiments of the present disclosure.

According to a first aspect, an embodiment of the present disclosure provides a data transmission method, including generating, by a first device, a first subframe and a second subframe according to first data, where the first subframe and the second subframe each include N orthogonal frequency division multiplexing (OFDM) symbols, determining, by the first device, a redundancy version (RV) of the first subframe according to an RV of the second subframe, where the RV of the first subframe and the RV of the second subframe are different, and sending, by the first device, M of the N OFDM symbols of the first subframe and the N OFDM symbols of the second subframe to a second device, where M and N are positive integers, M≤N, and the second subframe includes the RV of the second subframe.

With reference to the first aspect, in a first possible implementation of the first aspect, the second subframe further includes the RV of the first subframe.

With reference to the first aspect, in a second possible implementation of the first aspect, determining, by the first device, an RV of the first subframe according to an RV of the second subframe includes determining, by the first device, the RV Y of the first subframe according to a formula $Y=\mod(X+i,4)$, $X \in [0,3]$, $i \in [1,3]$, where X is the RV of the second subframe, mod( ) is a modulo function, and X, Y, and i are integers.

With reference to the second possible implementation of the first aspect, in a third possible implementation of the first aspect, when X is 0, Y is 2, 1, or 3, when X is 2, Y is 0, 1, or 3, when X is 1, Y is 0, 2, or 3, or when X is 3, Y is 0, 1, or 2.

With reference to any one of the first aspect to the third possible implementation of the first aspect, in a fourth possible implementation of the first aspect, generating, by a first device, a first subframe and a second subframe according to first data includes performing, by the first device, channel coding according to the first data to generate the N OFDM symbols of the first subframe and the N OFDM symbols of the second subframe.

With reference to any one of the first aspect to the fourth possible implementation of the first aspect, in a fifth possible implementation of the first aspect, the first subframe is a subframe on an unlicensed spectrum.

According to a second aspect, an embodiment of the present disclosure provides a data transmission method, including receiving, by a second device, M of N OFDM symbols of a first subframe and N OFDM symbols of a second subframe that are sent by a first device, where M and N are positive integers, M≤N, the second subframe includes an RV of the second subframe, the first subframe and the second subframe are generated according to first data, and the first subframe and the second subframe each include N OFDM symbols, and determining, by the second device, an RV of the first subframe according to the RV of the second subframe, where the RV of the first subframe and the RV of the second subframe are different.

With reference to the second aspect, in a first possible implementation of the second aspect, the second subframe further includes the RV of the first subframe.

With reference to the second aspect, in a second possible implementation of the second aspect, determining, by the second device, an RV of the first subframe according to the RV of the second subframe includes determining, by the second device, the RV Y of the first subframe according to a formula $Y=\mod(X+i,4)$, $X \in [0, 3]$, $i \in [1,3]$, where X is the RV of the second subframe, mod( ) is a modulo function, and X, Y, and i are integers.

With reference to the second possible implementation of the second aspect, in a third possible implementation of the second aspect, when X is 0, Y is 2, 1, or 3, when X is 2, Y is 0, 1, or 3, when X is 1, Y is 0, 2, or 3, or when X is 3, Y is 0, 1, or 2.

With reference to any one of the second aspect to the third possible implementation of the second aspect, in a fourth possible implementation of the second aspect, the first subframe is a subframe on an unlicensed spectrum.

According to a third aspect, an embodiment of the present disclosure provides a first device, including an encoding unit configured to generate a first subframe and a second subframe according to first data, where the first subframe and the second subframe each include N OFDM symbols, where the encoding unit is further configured to determine an RV of the first subframe according to an RV of the second subframe, where the RV of the first subframe and the RV of the second subframe are different, and a sending unit configured to send M of the N OFDM symbols of the first subframe generated by the encoding unit and the N OFDM symbols of the second subframe generated by the encoding unit to a second device, where M and N are positive integers, M≤N, and the second subframe includes the RV of the second subframe.

With reference to the third aspect, in a first possible implementation of the third aspect, the second subframe further includes the RV of the first subframe.

With reference to the third aspect, in a second possible implementation of the third aspect, the encoding unit is further configured to determine the RV Y of the first subframe according to a formula Y=mod(X+i,4), X∈[0,3], i∈[1,3], where X is the RV of the second subframe, mod( ) is a modulo function, and X, Y, and i are integers.

With reference to the second possible implementation of the third aspect, in a third possible implementation of the third aspect, when X is 0, Y is 2, 1, or 3, when X is 2, Y is 0, 1, or 3, when X is 1, Y is 0, 2, or 3, or when X is 3, Y is 0, 1, or 2.

With reference to any one of the third aspect to the third possible implementation of the third aspect, in a fourth possible implementation of the third aspect, the encoding unit is further configured to perform channel coding according to the first data to generate the N OFDM symbols of the first subframe and the N OFDM symbols of the second subframe.

With reference to any one of the third aspect to the fourth possible implementation of the third aspect, in a fifth possible implementation of the third aspect, the first subframe is a subframe on an unlicensed spectrum.

According to a fourth aspect, an embodiment of the present disclosure provides a second device, including a receiving unit configured to receive M of N OFDM symbols of a first subframe and N OFDM symbols of a second subframe that are sent by a first device, where M and N are positive integers, M≤N, the second subframe includes an RV of the second subframe, the first subframe and the second subframe are generated according to first data, and the first subframe and the second subframe each include N OFDM symbols, and a decoding unit configured to determine an RV of the first subframe according to the RV of the second subframe received by the receiving unit, where the RV of the first subframe and the RV of the second subframe are different.

With reference to the fourth aspect, in a first possible implementation of the fourth aspect, the second subframe further includes the RV of the first subframe.

With reference to the fourth aspect, in a second possible implementation of the fourth aspect, the decoding unit is further configured to determine the RV Y of the first subframe according to a formula Y=mod(X+i,4), X∈[0,3], i∈[1,3], where X is the RV of the second subframe, mod( ) is a modulo function, and X, Y, and i are integers.

With reference to the second possible implementation of the fourth aspect, in a third possible implementation of the fourth aspect, when X is 0, Y is 2, 1, or 3, when X is 2, Y is 0, 1, or 3, when X is 1, Y is 0, 2, or 3, or when X is 3, Y is 0, 1, or 2.

With reference to any one of the fourth aspect to the third possible implementation of the fourth aspect, in a fourth possible implementation of the fourth aspect, the first subframe is a subframe on an unlicensed spectrum.

According to a fifth aspect, an embodiment of the present disclosure provides a first device, including a processor, a memory, a bus, and a transmitter, where the processor, the memory, and the transmitter are connected to each other and communicate with each other using the bus, where the processor is configured to generate a first subframe and a second subframe according to first data, where the first subframe and the second subframe each include N OFDM symbols. The processor is further configured to determine an RV of the first subframe according to an RV of the second subframe, where the RV of the first subframe and the RV of the second subframe are different, and the transmitter is configured to send M of the N OFDM symbols of the first subframe generated by the processor and the N OFDM symbols of the second subframe generated by the processor to a second device, where M and N are positive integers, M≤N, and the second subframe includes the RV of the second subframe.

With reference to the fifth aspect, in a first possible implementation of the fifth aspect, the second subframe further includes the RV of the first subframe.

With reference to the fifth aspect, in a second possible implementation of the fifth aspect, the processor is further configured to determine the RV Y of the first subframe according to a formula Y=mod(X+i,4), X∈[0,3], i∈[1,3], where X is the RV of the second subframe, mod( ) is a modulo function, and X, Y, and i are integers.

With reference to the second possible implementation of the fifth aspect, in a third possible implementation of the fifth aspect, when X is 0, Y is 2, 1, or 3, when X is 2, Y is 0, 1, or 3, when X is 1, Y is 0, 2, or 3, or when X is 3, Y is 0, 1, or 2.

With reference to any one of the fifth aspect to the third possible implementation of the fifth aspect, in a fourth possible implementation of the fifth aspect, the processor is further configured to perform channel coding according to the first data to generate the N OFDM symbols of the first subframe and the N OFDM symbols of the second subframe.

With reference to any one of the fifth aspect to the fourth possible implementation of the fifth aspect, in a fifth possible implementation of the fifth aspect, the first subframe is a subframe on an unlicensed spectrum.

According to a sixth aspect, an embodiment of the present disclosure provides a second device, including a processor, a memory, a bus, and a receiver, where the processor, the memory, and the receiver are connected to each other and communicate with each other using the bus, where the receiver is configured to receive M of N OFDM symbols of a first subframe and N OFDM symbols of a second subframe that are sent by a first device, where M and N are positive integers, M≤N, the second subframe includes an RV of the second subframe, the first subframe and the second subframe are generated according to first data, and the first subframe and the second subframe each include N OFDM symbols, and the processor is configured to determine an RV of the first subframe according to the RV of the second subframe received by the receiver, where the RV of the first subframe and the RV of the second subframe are different.

With reference to the sixth aspect, in a first possible implementation of the sixth aspect, the second subframe further includes the RV of the first subframe.

With reference to the sixth aspect, in a second possible implementation of the sixth aspect, the processor is further configured to determine the RV Y of the first subframe according to a formula Y=mod(X+i,4), X∈[0,3], i∈[1,3], where X is the RV of the second subframe, mod( ) is a modulo function, and X, Y, and i are integers.

With reference to the second possible implementation of the sixth aspect, in a third possible implementation of the sixth aspect, when X is 0, Y is 2, 1, or 3, when X is 2, Y is 0, 1, or 3, when X is 1, Y is 0, 2, or 3, or when X is 3, Y is 0, 1, or 2.

With reference to any one of the sixth aspect or the third possible implementation of the sixth aspect, in a fourth possible implementation of the sixth aspect, the first subframe is a subframe on an unlicensed spectrum.

According to a seventh aspect, an embodiment of the present disclosure provides a wireless communications system, including a first device and a second device, where the first device is the first device described in the third aspect or in any one of the possible implementations of the third aspect, and the second device is the second device described in the fourth aspect or in any one of the possible implementations of the fourth aspect, or the first device is the first device described in the fifth aspect or in any one of the possible implementations of the fifth aspect, and the second device is the second device described in the sixth aspect or in any one of the possible implementations of the sixth aspect.

According to the data transmission method, device, and system that are provided in the embodiments of the present disclosure, a first device generates a first subframe and a second subframe according to first data, determines an RV of the first subframe according to an RV of the second subframe, and sends M of N OFDM symbols of the first subframe and N OFDM symbols of the second subframe to a second device. This resolves a problem that encoding cannot be performed based on an incomplete subframe because a length of the incomplete subframe is unknown.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be understood that, the technical solutions of the embodiments of the present disclosure may be applied to various communications systems, such as a Global System for Mobile Communications (GSM) system, a Code Division Multiple Access (CDMA) system, a Wideband CDMA (WCDMA) system, a general packet radio service (GPRS), a Long Term Evolution (LTE) system, an LTE frequency division duplex (FDD) system, an LTE time division duplex (TDD), Universal Mobile Telecommunications System (UMTS), and a Worldwide Interoperability for Microwave Access (WIMAX) communications system.

It should be understood that in the embodiments of the present disclosure, a first device or a second device includes but is not limited to user equipment, a mobile station (MS), a mobile terminal, a mobile telephone, a handset, a portable equipment, and the like. The user equipment may communicate with one or more core networks using a radio access network (RAN). For example, the user equipment may be a mobile telephone (or referred to as a "cellular" phone), or a computer having a wireless communication function. The user equipment may further be a portable, pocket-sized, handheld, computer built-in, or in-vehicle mobile apparatus.

In the embodiments of the present disclosure, the first device or the second device may be a base station (such as Base Transceiver Station (BTS)) in GSM or CDMA, or may be a base station (NodeB) in WCDMA, or may be an evolved NodeB (eNB or e-NodeB) in LTE, and this is not limited in the embodiments of the present disclosure.

It should be noted that in the embodiments of the present disclosure, "first" and "second" are merely used for distinction, but are not intended to limit the embodiments of the present disclosure. Further, when the first device is a base station, the second device may be user equipment. Alternatively, when the first device is user equipment, the second device may be a base station. Alternatively, when the first device is user equipment, the second device may also be user equipment, and they perform device-to-device communication. This is not limited in the embodiments of the present disclosure.

An embodiment of the present disclosure provides a data transmission method.

Figure 1:
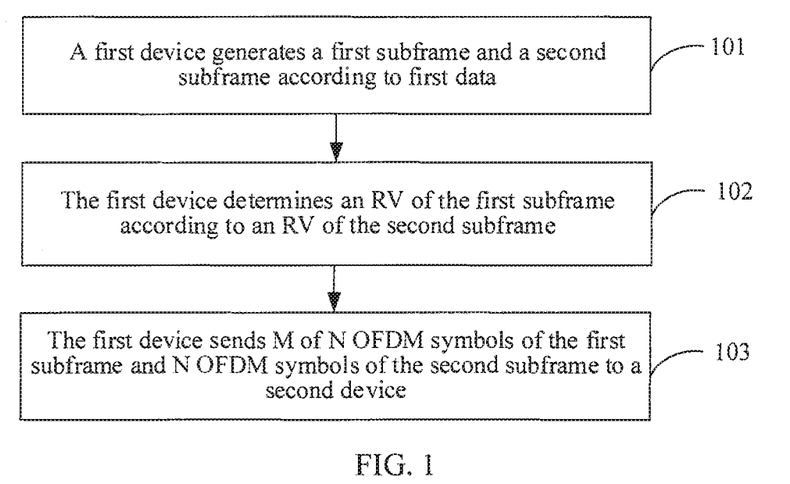
FIG. 1 is a schematic flowchart of a data transmission method according to an embodiment of the present disclosure.

Preferably, the method is applied to an LTE system. Referring to FIG. 1, the method includes the following steps.

Step 101: A first device generates a first subframe and a second subframe according to first data.

The first subframe and the second subframe each include N OFDM symbols. N is a positive integer. Preferably, N is 12 or 14. When a normal cyclic prefix (CP) is used for the subframes, one subframe includes 14 OFDM symbols, and N may be 14. When an extended CP is used for the subframes, one subframe includes 12 OFDM symbols, and N may be 12. Preferably, the first subframe is a subframe on an unlicensed spectrum.

Optionally, the first device performs channel coding according to the first data to generate N OFDM symbols of the first subframe and N OFDM symbols of the second subframe. Channel coding RVs used for the first subframe and the second subframe are different.

Step 102: The first device determines an RV of the first subframe according to an RV of the second subframe.

The RV of the first subframe and the RV of the second subframe are different. Data sent in the first subframe and the second subframe is the same, and is the first data. If the RVs of the first subframe and the second subframe are the same, content sent in the first subframe and the second subframe is the same. Herein, in a preferred solution, the RVs of the first subframe and the second subframe are different. This is equivalent to that two channel coding versions of the first data are sent, and a receiving device decodes the two channel coding versions. Therefore, the obtained first data is more reliable.

Preferably, the first device determines the RV Y of the first subframe according to a formula $Y=mod(X+i,4)$, $X \in [0,3]$, $i \in [1,3]$. X is the RV of the second subframe, mod( ) is a modulo function, and X, Y, and i are integers.

For example, when X is 0, Y is 2, 1, or 3, when X is 2, Y is 0, 1, or 3, when X is 1, Y is 0, 2, or 3, or when X is 3, Y is 0, 1, or 2.

Further, optionally, the second subframe may further include the RV of the first subframe. After the RV of the first subframe is determined according to the foregoing formula, the RV of the first subframe may be sent to the receiving device using the second subframe, thereby further ensuring correctness of transmitted information.

Step 103: The first device sends M of the N OFDM symbols of the first subframe and the N OFDM symbols of the second subframe to a second device.

M and N are positive integers, and M≤N. The second subframe includes the RV of the second subframe.

With reference to step 101, optionally, in an application scenario of preempting an unlicensed spectrum, the first subframe and the second subframe are both subframes on an unlicensed spectrum. Preferably, the first subframe is an incomplete subframe. After the first device successfully preempts the unlicensed spectrum, the first device may send data at any moment. Therefore, a length of the first subframe cannot be determined, that is, a quantity of OFDM symbols that can be transmitted in the first subframe cannot be determined. In step 101, the quantity of OFDM symbols included in the first subframe is set to N. Because the second subframe is a complete subframe, a quantity of OFDM symbols included in the second subframe is N. Then channel coding and code modulation are performed on the first data to generate the N OFDM symbols of the first subframe and the N OFDM symbols of the second subframe. In step 102, the first subframe transmits a quantity of OFDM symbols as many as possible. This resolves a problem that code modulation cannot be performed on an incomplete subframe due to an unpredictable length of the incomplete subframe. Because the data transmitted by the first subframe and the second subframe is the same, even though the N OFDM symbols generated after code modulation is performed for the first subframe are not all transmitted, reception of the first data by a receive end is not affected because the N OFDM symbols of the second subframe are all transmitted.

Optionally, the data transmitted in the first subframe and the second subframe is the same, and a same resource scheduling manner is used for the first subframe and the second subframe. Therefore, the first subframe and the second subframe are scheduled using same control signaling. Preferably, downlink control information (DCI) of the second subframe indicates both resource scheduling of the first subframe and resource scheduling of the second subframe. Preferably, the RV of the second subframe is included in the DCI of the second subframe.

According to the data transmission method provided in this embodiment of the present disclosure, a first device generates a first subframe and a second subframe according to first data, determines an RV of the first subframe according to an RV of the second subframe, and sends M of N OFDM symbols of the first subframe and N OFDM symbols of the second subframe to a second device. This resolves a problem that encoding cannot be performed based on an incomplete subframe because a length of the incomplete subframe is unknown.

Figure 2:
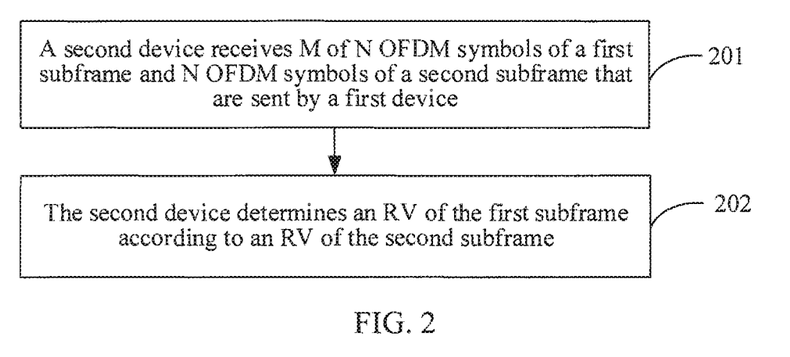
FIG. 2 is a schematic flowchart of a data transmission method according to another embodiment of the present disclosure.

A data transmission method provided in another embodiment of the present disclosure corresponds to a receiving side of the data transmission method described in the embodiment corresponding to FIG. 1, and preferably, is applied to an LTE system. Referring to FIG. 2, the method includes the following steps.

Step 201: A second device receives M of N OFDM symbols of a first subframe and N OFDM symbols of a second subframe that are sent by a first device.

M and N are positive integers, and M≤N. The second subframe includes an RV of the second subframe. The first subframe and the second subframe are generated according to first data. The first subframe and the second subframe each include N OFDM symbols. N is a positive integer. Preferably, N is 12 or 14. When a normal CP is used for the subframes, one subframe includes 14 OFDM symbols, and N may be 14. When an extended CP is used for the subframes, one subframe includes 12 OFDM symbols, and N may be 12. Preferably, the first subframe is a subframe on an unlicensed spectrum.

Step 202: The second device determines an RV of the first subframe according to an RV of the second subframe.

The RV of the first subframe and the RV of the second subframe are different. Data sent in the first subframe and the second subframe is the same, and is the first data. If the RVs of the first subframe and the second subframe are the same, content sent in the first subframe and the second subframe is the same. Herein, in a preferred solution, the RVs of the first subframe and the second subframe are different. This is equivalent to that two channel coding versions of the first data are sent, and a receiving device decodes the two channel coding versions. Therefore, the obtained first data is more reliable.

Preferably, the second device determines the RV Y of the first subframe according to a formula $Y=mod(X+i,4)$, $X \in [0, 3]$, $i \in [1,3]$. X is the RV of the second subframe, mod( ) is a modulo function, and X, Y, and i are integers.

For example, when X is 0, Y is 2, 1, or 3, when X is 2, Y is 0, 1, or 3, when X is 1, Y is 0, 2, or 3, or when X is 3, Y is 0, 1, or 2.

Further, optionally, the second subframe may further include the RV of the first subframe. After the RV of the first subframe is determined according to the foregoing formula, a check may be performed using the RV of the first subframe that is included in the second subframe, thereby further ensuring correctness of transmitted information.

According to the data transmission method provided in this embodiment of the present disclosure, a second device receives M of N OFDM symbols of a first subframe and N OFDM symbols of a second subframe that are sent by a first device, and determines an RV of the first subframe according to an RV of the second subframe. This resolves a problem that encoding cannot be performed based on an incomplete subframe because a length of the incomplete subframe is unknown.

Figure 3:
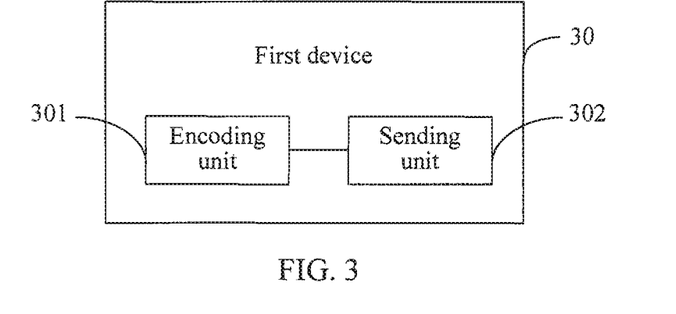
FIG. 3 is a schematic structural diagram of a first device according to an embodiment of the present disclosure.

Based on the embodiment corresponding to FIG. 1, an embodiment of the present disclosure provides a first device 30 to execute the data transmission method described in the embodiment corresponding to FIG. 1. Preferably, the first device 30 is applied to an LTE system. Referring to FIG. 3, the first device 30 includes an encoding unit 301 and a sending unit 302.

The encoding unit 301 is configured to generate a first subframe and a second subframe according to first data. The first subframe and the second subframe each include N OFDM symbols. Preferably, the first subframe is a subframe on an unlicensed spectrum.

The encoding unit 301 is further configured to determine an RV of the first subframe according to an RV of the second subframe. The RV of the first subframe and the RV of the second subframe are different.

The sending unit 302 is configured to send M of the N OFDM symbols of the first subframe generated by the encoding unit 301 and the N OFDM symbols of the second subframe generated by the encoding unit 301 to a second device. M and N are positive integers, M≤N, and the second subframe includes the RV of the second subframe. Optionally, the second subframe may further include the RV of the first subframe.

Optionally, the encoding unit 301 is further configured to determine the RV Y of the first subframe according to a formula Y=mod(X+i,4), X∈[0,3], i∈[1,3]. X is the RV of the second subframe, mod( ) is a modulo function, and X, Y, and i are integers.

For example, when X is 0, Y is 2, 1, or 3, when X is 2, Y is 0, 1, or 3, when X is 1, Y is 0, 2, or 3, or when X is 3, Y is 0, 1, or 2.

Optionally, the encoding unit 301 is further configured to perform channel coding according to the first data to generate the N OFDM symbols of the first subframe and the N OFDM symbols of the second subframe.

The first device 30 provided in this embodiment of the present disclosure generates a first subframe and a second subframe according to first data, determines an RV of the first subframe according to an RV of the second subframe, and sends M of N OFDM symbols of the first subframe and N OFDM symbols of the second subframe to a second device. This resolves a problem that encoding cannot be performed based on an incomplete subframe because a length of the incomplete subframe is unknown.

Figure 4:
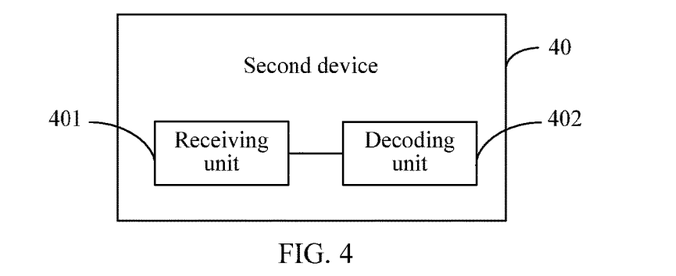
FIG. 4 is a schematic structural diagram of a second device according to an embodiment of the present disclosure.

Based on the embodiment corresponding to FIG. 2, an embodiment of the present disclosure provides a second device 40, to execute the data transmission method described in the embodiment corresponding to FIG. 2. Preferably, the second device 40 is applied to an LTE system. Referring to FIG. 4, the second device 40 includes a receiving unit 401 and a decoding unit 402.

The receiving unit 401 is configured to receive M of N OFDM symbols of a first subframe and N OFDM symbols of a second subframe that are sent by a first device. M and N are positive integers, M≤N, the second subframe includes an RV of the second subframe, the first subframe and the second subframe are generated according to first data, and the first subframe and the second subframe each include N OFDM symbols. Preferably, the first subframe is a subframe on an unlicensed spectrum. Optionally, the second subframe may further include an RV of the first subframe.

The decoding unit 402 is configured to determine the RV of the first subframe according to the RV of the second subframe received by the receiving unit 401. The RV of the first subframe and the RV of the second subframe are different.

Optionally, the decoding unit 402 is further configured to determine the RV Y of the first subframe according to a formula Y=mod(X+i,4), X∈[0,3], i∈[1,3]. X is the RV of the second subframe, mod( ) is a modulo function, and X, Y, and i are integers.

For example, when X is 0, Y is 2, 1, or 3, when X is 2, Y is 0, 1, or 3, when X is 1, Y is 0, 2, or 3, or when X is 3, Y is 0, 1, or 2.

The second device 40 provided in this embodiment of the present disclosure receives M of N OFDM symbols of a first subframe and N OFDM symbols of a second subframe that are sent by a first device, and determines an RV of the first subframe according to an RV of the second subframe. This resolves a problem that encoding cannot be performed based on an incomplete subframe because a length of the incomplete subframe is unknown.

Figure 5:
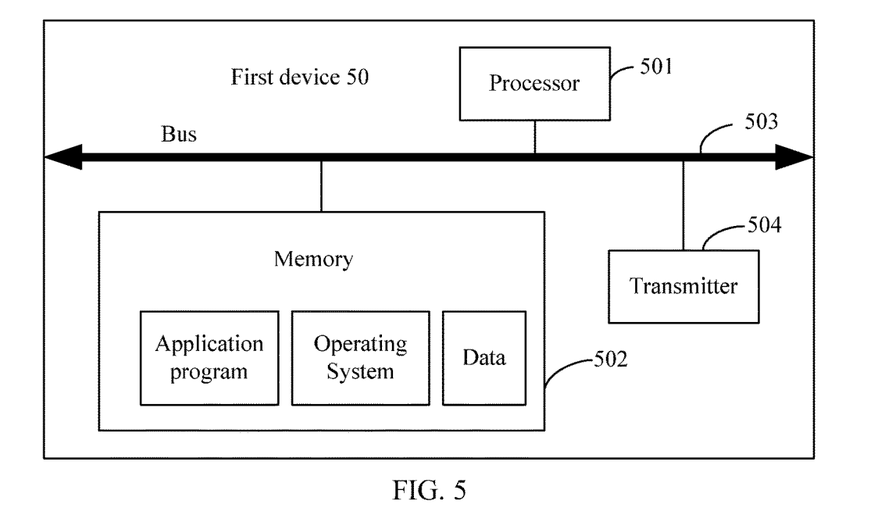
FIG. 5 is a schematic structural diagram of a first device according to another embodiment of the present disclosure.

Based on the embodiment corresponding to FIG. 1, another embodiment of the present disclosure provides a first device 50, to execute the data transmission method described in the embodiment corresponding to FIG. 1. Preferably, the first device 50 is applied to an LTE system. Referring to FIG. 5, the first device 50 includes at least one processor 501, memory 502, bus 503, and transmitter 504. The at least one processor 501, memory 502, and transmitter 504 are connected to each other and communicate with each other using the bus 503.

The bus 503 may be an industry standard architecture (ISA) bus, a peripheral component interconnect (PCI) bus, an extended ISA (EISA) bus, or the like. The bus 503 may be classified into an address bus, a data bus, a control bus, and the like. For ease of representation, the bus 503 is represented in FIG. 5 using only one bold line, but it does not indicate that there is only one bus or only one type of bus.

The memory 502 is used for application program for executing the solutions of the present disclosure. The application program for executing the solutions of the present disclosure is stored in the memory 502, and is controlled and executed by the processor 501. The memory 502 further includes operating system and data.

The memory 502 may be a read-only memory (ROM), a static storage device of another type that can store static information and an instruction, a random access memory (RAM), or a dynamic storage device of another type that can store information and an instruction, or may be an electrically erasable programmable ROM (EEPROM), a compact disc ROM (CD-ROM) or another optical disc storage, a disc storage (including a compact disc (CD), a laser disc, an optical disc, a digital versatile disc (DVD), a BLU-RAY DISC, or the like), a magnetic disk storage medium or another magnetic disk storage device, or any other medium that can be used to carry or store expected program code in an instruction or data structure form and that can be accessed by a computer, but the present disclosure is not limited thereto. These memories are connected to the processor 501 using the bus 503.

The processor 501 may be a central processing unit (CPU), an application-specific integrated circuit (ASIC), or one or more integrated circuits configured to implement this embodiment of the present disclosure.

The processor 501 is configured to invoke the application program in the memory 502. In a possible implementation, when the foregoing application program is executed by the processor 501, the following functions are implemented.

The processor 501 is configured to generate a first subframe and a second subframe according to first data. The first subframe and the second subframe each include N OFDM symbols. Preferably, the first subframe is a subframe on an unlicensed spectrum.

The processor 501 is further configured to determine an RV of the first subframe according to an RV of the second subframe. The RV of the first subframe and the RV of the second subframe are different.

The transmitter 504 is configured to send M of N OFDM symbols of the first subframe generated by the processor 501 and N OFDM symbols of the second subframe generated by the processor 501 to a second device. M and N are positive integers, M≤N, and the second subframe includes the RV of the second subframe. Optionally, the second subframe may further include the RV of the first subframe.

Optionally, the processor 501 is further configured to determine the RV Y of the first subframe according to a formula Y=mod(X+i,4), X∈[0,3], i∈[1,3]. X is the RV of the second subframe, mod( ) is a modulo function, and X, Y, and i are integers.

For example, when X is 0, Y is 2, 1, or 3, when X is 2, Y is 0, 1, or 3, when X is 1, Y is 0, 2, or 3, or when X is 3, Y is 0, 1, or 2.

Optionally, the processor 501 is further configured to perform channel coding according to the first data to generate the N OFDM symbols of the first subframe and the N OFDM symbols of the second subframe.

The first device 50 provided in this embodiment of the present disclosure generates a first subframe and a second subframe according to first data, determines an RV of the first subframe according to an RV of the second subframe, and sends M of N OFDM symbols of the first subframe and N OFDM symbols of the second subframe to a second device. This resolves a problem that encoding cannot be performed based on an incomplete subframe because a length of the incomplete subframe is unknown.

Figure 6:
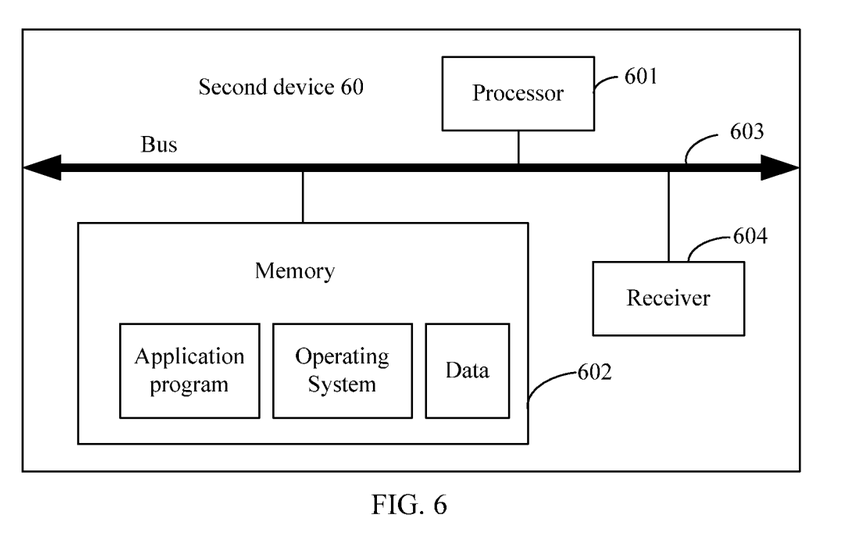
FIG. 6 is a schematic structural diagram of a second device according to another embodiment of the present disclosure.

Based on the embodiment corresponding to FIG. 2, another embodiment of the present disclosure provides a second device 60, to execute the data transmission method described in the embodiment corresponding to FIG. 2. Preferably, the second device 60 is applied to an LTE system. Referring to FIG. 6, the second device 60 includes at least one processor 601, memory 602, bus 603, and receiver 604. The at least one processor 601, memory 602, and receiver 604 are connected to each other and communicate with each other using the bus 603.

The bus 603 may be an ISA bus, a PCI bus, an EISA bus, or the like. The bus 603 may be classified into an address bus, a data bus, a control bus, and the like. For ease of representation, the bus 603 is represented in FIG. 6 using only one bold line, but it does not indicate that there is only one bus or only one type of bus.

The memory 602 is used for application program for executing the solutions of the present disclosure. The application program for executing the solutions of the present disclosure is stored in the memory 602, and is controlled and executed by the processor 601. The memory 602 further includes operating system and data.

The memory 602 may be a ROM, a static storage device of another type that can store static information and an instruction, a RAM, or a dynamic storage device of another type that can store information and an instruction, or may be an EEPROM, a CD-ROM or another optical disc storage, a disc storage (including a CD, a laser disc, an optical disc, a DVD, a BLU-RAY DISC, or the like), a magnetic disk storage medium or another magnetic disk storage device, or any other medium that can be used to carry or store expected program code in an instruction or data structure form and that can be accessed by a computer, but the present disclosure is not limited thereto. These memories are connected to the processor 601 using the bus 603.

The processor 601 may be a CPU, an ASIC, or one or more integrated circuits configured to implement this embodiment of the present disclosure.

The receiver 604 is configured to receive M of N OFDM symbols of a first subframe and N OFDM symbols of a second subframe that are sent by a first device. M and N are positive integers, M≤N, the second subframe includes an RV of the second subframe, the first subframe and the second subframe are generated according to first data, and the first subframe and the second subframe each include N OFDM symbols. Preferably, the first subframe is a subframe on an unlicensed spectrum. Optionally, the second subframe may further include an RV of the first subframe.

The processor 601 is configured to determine the RV of the first subframe according to the RV of the second subframe received by the receiver 604. The RV of the first subframe and the RV of the second subframe are different.

Optionally, the processor 601 is further configured to determine the RV Y of the first subframe according to a formula Y=mod(X+i,4), X∈[0,3], i∈[1,3]. X is the RV of the second subframe, mod( ) is a modulo function, and X, Y, and i are integers.

For example, when X is 0, Y is 2, 1, or 3, when X is 2, Y is 0, 1, or 3, when X is 1, Y is 0, 2, or 3, or when X is 3, Y is 0, 1, or 2.

The second device 60 provided in this embodiment of the present disclosure receives M of N OFDM symbols of a first subframe and N OFDM symbols of a second subframe that are sent by a first device, and determines an RV of the first subframe according to an RV of the second subframe. This resolves a problem that encoding cannot be performed based on an incomplete subframe because a length of the incomplete subframe is unknown.

Figure 7:
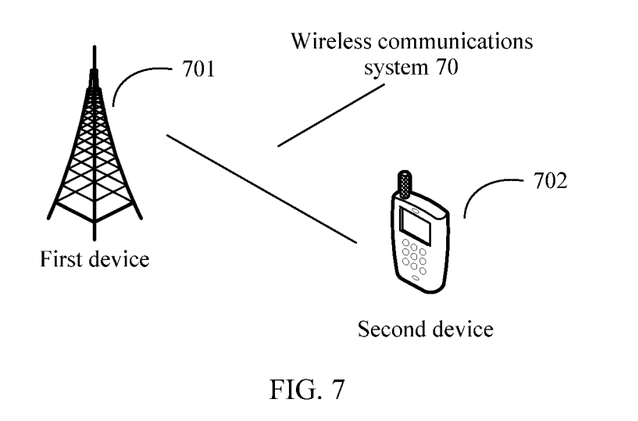
FIG. 7 is a schematic structural diagram of a wireless communications system according to an embodiment of the present disclosure.

Based on the embodiments corresponding to FIG. 1 and FIG. 2, an embodiment of the present disclosure provides a wireless communications system 70, to execute the data transmission methods described in the embodiments corresponding to FIG. 1 and FIG. 2. Preferably, the wireless communications system 70 is applied to an LTE system. Referring to FIG. 7, the wireless communications system 70 includes a first device 701 and a second device 702. The first device 701 and the second device 702 shown in FIG. 7 are merely used for distinction, but are not used for limitation.

The first device 701 is the first device described in the embodiment corresponding to FIG. 3. The second device 702 is the second device described in the embodiment corresponding to FIG. 4.

Alternatively, the first device 701 is the first device described in the embodiment corresponding to FIG. 5. The second device 702 is the second device described in the embodiment corresponding to FIG. 6.

In the wireless communications system 70 provided in this embodiment of the present disclosure, the first device 701 generates a first subframe and a second subframe according to first data, determines an RV of the first subframe according to an RV of the second subframe, and sends M of N OFDM symbols of the first subframe and N OFDM symbols of the second subframe to the second device 702. This resolves a problem that encoding cannot be performed based on an incomplete subframe because a length of the incomplete subframe is unknown.

In addition, a computer readable medium (or medium) is further provided, including a computer readable instruction for performing operations of steps 101 to 103 or steps 201 and 202 of the methods in the foregoing embodiments when being executed.

In addition, a computer program product is further provided, including the foregoing computer readable medium.

It should be noted that, the signaling mentioned herein includes, but is not limited to, an indication, information, a signal, a message, or the like, which is not limited herein.

The term "and/or" in this specification describes only an association relationship for describing associated objects and represents that three relationships may exist. For example, A and/or B may represent the following three cases. Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data transmission method, comprising:
   generating, by a first device, a first subframe and a second subframe according to first data, the first subframe and the second subframe each comprising N orthogonal frequency division multiplexing (OFDM) symbols;
   determining, by the first device, a redundancy version (RV) of the first subframe (Y) according to an RV of the second subframe (X), the Y being determined, by the first device, according to a formula $Y=\mod(X+i,4)$, $X \in [0,3]$, $i \in [1,3]$, mod( ) being a modulo function, and X, Y, and i being integers; and
   sending, by the first device, M of the N OFDM symbols of the first subframe and the N OFDM symbols of the second subframe to a second device, M and N being positive integers, M being less than or equal to N, the X and the Y being included in the second subframe, and the first device thereby performing encoding on an incomplete subframe.

2. The data transmission method of claim 1, wherein when X is 0, Y is 2, 1, or 3.

3. The data transmission method of claim 1, wherein generating the first subframe and the second subframe comprises performing, by the first device, channel coding according to the first data to generate the N OFDM symbols of the first subframe and the N OFDM symbols of the second subframe.

4. The data transmission method of claim 1, wherein the first subframe is a subframe on an unlicensed spectrum.

5. The data transmission method of claim 1, wherein when X is 2, Y is 0, 1, or 3.

6. The data transmission method of claim 1, wherein when X is 1, Y is 0, 2, or 3.

7. The data transmission method of claim 1, wherein when X is 3, Y is 0, 1, or 2.

8. A data transmission method, comprising:
   receiving, by a second device, M of N orthogonal frequency division multiplexing (OFDM) symbols of a first subframe and N OFDM symbols of a second subframe from a first device, M and N being positive integers, M being less than or equal to N, the second subframe comprising a redundancy version (RV) of the second subframe (X), the first subframe and the second subframe being generated according to first data, and the first subframe and the second subframe each comprising N OFDM symbols; and determining, by the second device, an RV of the first subframe (Y) according to the X, the Y being determined, by the second device, according to a formula Y=mod(X+i,4), X∈[0,3], i∈[1,3], mod( ) being a modulo function, X, Y, and i being integers, the X and the Y being included in the second subframe, and the second device thereby performing encoding on an incomplete subframe.

9. The data transmission method of claim 8, wherein when X is 0, Y is 2, 1, or 3.

10. The data transmission method of claim 8, wherein the first subframe is a subframe on an unlicensed spectrum.

11. The data transmission method of claim 8, wherein when X is 2, Y is 0, 1, or 3.

12. The data transmission method of claim 8, wherein when X is 1, Y is 0, 2, or 3.

13. The data transmission method of claim 8, wherein when X is 3, Y is 0, 1, or 2.

14. A first device, comprising:
a bus;
a memory coupled to the bus;
a transmitter coupled to the bus; and
a processor coupled to the bus, the processor, the memory, and the transmitter being coupled to each other and communicating with each other using the bus, and the processor being configured to:
generate a first subframe and a second subframe according to first data, the first subframe and the second subframe each comprising N orthogonal frequency division multiplexing (OFDM) symbols;
determine a redundancy version (RV) of the first subframe (Y) according to an RV of the second subframe (X); and
determine the Y according to a formula Y=mod(X+i,4), X∈[0,3], i∈[1,3], mod( ) being a modulo function, and X, Y, and i being integers, and the transmitter being configured to send M of the N OFDM symbols of the first subframe generated by the processor and the N OFDM symbols of the second subframe generated by the processor to a second device, M and N being positive integers, M is less than or equal to N, the X and the Y being included in the second subframe, and the first device thereby performing encoding on an incomplete subframe.

15. The first device of claim 14, wherein the processor is further configured to perform channel coding according to the first data to generate the N OFDM symbols of the first subframe and the N OFDM symbols of the second subframe.

* * * * *